(No Model.)
C. BILLUPS.
PLOW.
No. 362,598. Patented May 10, 1887.
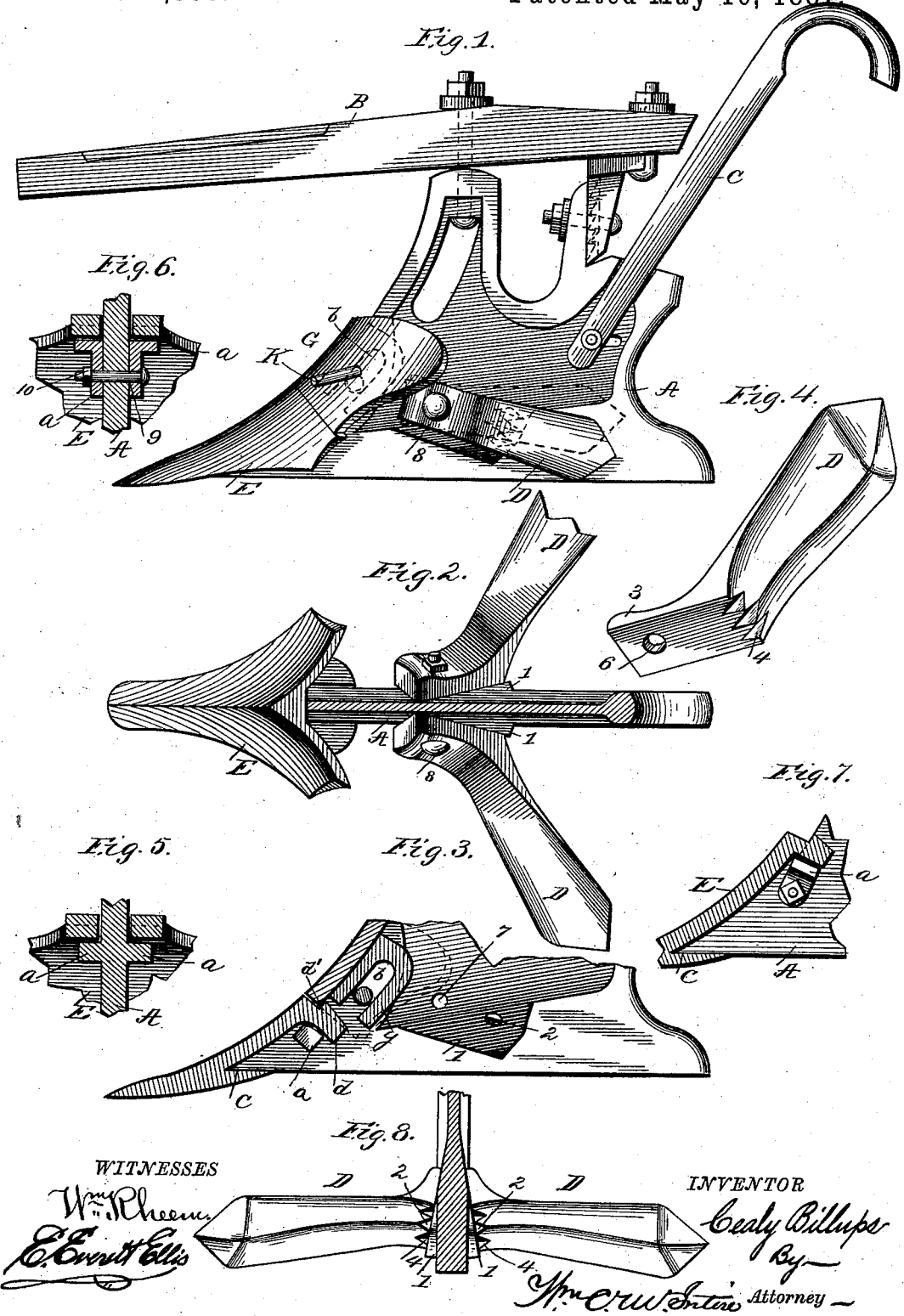
WITNESSES
INVENTOR

UNITED STATES PATENT OFFICE.

CEALY BILLUPS, OF NORFOLK, VIRGINIA.

PLOW.

SPECIFICATION forming part of Letters Patent No. 362,598, dated May 10, 1887.

Application filed March 22, 1887. Serial No. 231,906. (No model.)

*To all whom it may concern:*

Be it known that I, CEALY BILLUPS, a citizen of the United States, residing at Norfolk, county of Norfolk, State of Virginia, have invented new and useful Improvements in Plows, of which the following is a specification.

This invention relates to certain new and useful improvements in plows; and it consists substantially in the same as constructed, and in such features of arrangement and combinations of parts as will hereinafter be more particularly described, and pointed out in the claims.

The object of the invention is to provide a simplified form of plow-point for readily effecting attachment thereof to the standard; also a peculiarity of form of mold-board designed to hold the plow-point in its place after being attached without the necessity of special securing means therefor, and to so construct the same as to cause it to break the sliding force of the dirt, and thus prevent the covering up of small plants while plowing.

The invention has for its object, further, to provide the plow with side sweeps capable of reversibility, so as to utilize at will the two cutting-edges with which the same are constructed, and to permit of either one or both of them being used, accordingly as they may be required, with either a single or double mold-board plow, the said sweeps being also designed for adjustment to varying angles or degrees of pitch, as may be required under various conditions incident to the uses of the plow, and, finally, the invention has such other objects in view as will more fully hereinafter appear, when taken in connection with the accompanying drawings, wherein—

Figure 1 represents a side view of plow embodying my invention, and Fig. 2 is a horizontal sectional view thereof. Fig. 3 is a side view of a portion of the standard, showing the mold-board and plow share or point by which to indicate the form of attachment of the latter. Fig. 4 is a view in perspective of one of the side sweeps. Fig. 5 is a sectional detail showing, as when viewed from the rear, the mode of attachment of the point to the standard, and Fig. 6 is a similar view of a modification of such attachment. Fig. 7 is a sectional view showing the modification, Fig. 6, as when viewed from the side. Fig. 8 represents a portion of the standard in section, representing the construction thereof on opposite sides, by which the side sweeps are maintained at adjustable points.

In an application marked "A," filed February 23, 1887, Serial No. 228,530, I have set forth certain improvements in this class of inventions, and wherein I have set forth and shown the same arrangement of both the plow beam and handles as is shown in the present instance. It will be understood that I lay no claim herein to such features. In the present case, as in the one referred to, the mold-board may be cast or formed of either one or two pieces.

Reference being had to the several parts by the letters of reference marked thereon, A represents the standard, B the beam, and C the handles, the construction, attachment, and arrangement of these being the same as in the accompanying application referred to, with the exception that on opposite sides of the standard, in order to practice the present invention, it is necessary to provide what I term "hips" 1 1, having projecting therefrom pegs 2 2, preferably of a beveled form, although any desired configuration thereof may be employed.

D D represent the adjustable and reversible side sweeps, each being formed with a right-angle portion, 3, for resting against the side of the standard, and having a series of notches at the angle formed with the sweep proper, such notches being indicated at 4, and for the purpose of engaging the teeth 2 2 on the sides of the standard, the said sweeps being also provided in their portions 3 with an opening, 6, coinciding with a similar opening, 7, in the standard, a bolt, 8, passing through and securing said sweeps in position in an obvious manner. It is evident that by turning these sweeps upon the bolt which secures them they may be adjusted to varying angles, and it will be seen, further, that I have provided the same with two cutting-edges, so as to be able to change or reverse the sweeps to opposite sides of the standard, thereby gaining a considerable amount of wear. I also form the sweeps pointed or bevel-shaped on their outer ends, by which construction the dirt will be pushed close under plants without covering up same.

The standard A is formed upon opposite sides, near its lower forward edge, with lugs $a$, while slightly above these lugs the said standard is formed with a vertical slot or opening, $b$. The point E is recessed or hollowed out on its under side, as at $c$, to form a seat for the reception of the nose or lower forward corner of the standard, and it is formed with two slightly-curved lugs or ears, $d\ d$, that are designed to slip over or fit upon the flanges $a\ a$ when the point is attached, the said ears being recessed slightly, as at $d'$, for the reception of the lower edge of the mold-board.

Instead of forming the flanges $a\ a$ as an integral part of the standard, (see Figs. 3 and 5,) I may cast them separate and attach them to the standard by means of a bolt and nut, indicated by the numerals 9 and 10. (See Figs. 6 and 7.)

It is obvious that many modifications in the shape or form of the ears can be resorted to, as well as in the construction of lugs around which they fit.

G represents the mold-board, formed of either one or two parts, the same having a slotted web or rib, $g$, fitting against the side of the standard, to which it is secured by means of a bolt and nut, in like manner as in the other application referred to. It will be observed that the lower edge thereof rests or fits upon the top of the lugs or ears $d\ d$, thus acting to retain the plow-point securely in place against accidental dislodgment.

When it is desired to remove the point, all that is necessary to do is to loosen the securing-nut of the mold-board and slightly elevate the latter, whereupon the lugs of the point can be easily slipped from their connection with those of the standard around which they fit.

With the mold-board I form a projecting peg, K, which may be round, square, triangular, or any other shape, and which may be set on the face of the board at any preferred angle. The design of this peg is to break the sliding force of the dirt, and thus prevent the covering up of small plants.

Having thus described my invention, what I claim as new, and desire to secure by Letters Patent, is—

1. In a plow, the combination of a standard formed or provided on opposite sides with lugs, a point or share fitting upon said lugs, and a mold-board secured to the standard and maintaining the attachment of the point, substantially as described.

2. In a plow, the combination, with a standard formed or provided with lugs on opposite sides of its lower edge, of a plow share or point recessed, as at $c$, for receiving the nose of the standard, and having curved lugs or ears adapted to fit upon those of said standard, and a mold-board secured to the standard and maintaining the attachment of the point, substantially as described.

3. In a plow, the combination, with the standard, formed on opposite sides with hips 1 1 and pegs or teeth 2 2, of the adjustable and reversible sweeps having portion 3 and formed with notches 4, the said sweeps having double cutting-edges and formed beveled or pointed at their outer ends and the same being held to the sides of the standard by a bolt and nut in such manner as that the notches thereof will receive the teeth or pegs on the standard, substantially as described.

4. The combination, with a plow of the character described, of a mold-board formed with a projecting peg, K, as and for the purpose set forth.

5. In a plow, the combination, with a standard having slot $b$ and formed on opposite sides with lugs and teeth or pegs, the point having recess $c$ on its under side and provided with lugs to fit those of the standard, the mold-board G, formed with pegs, and the reversible sweeps secured to the opposite sides of the standard adjustably by a bolt and nut, the same being formed with notches adapted to fit the pegs or teeth on said standard, as shown and set forth.

In testimony whereof I have hereunto set my hand in the presence of two subscribing witnesses.

CEALY BILLUPS.

Witnesses:
K. H. GAYLE,
L. ROYSTER.